US012587847B2

(12) United States Patent
Reznik et al.

(10) Patent No.: US 12,587,847 B2
(45) Date of Patent: Mar. 24, 2026

(54) ENABLING COORDINATED IDENTITY MANAGEMENT BETWEEN AN OPERATOR-MANAGED MOBILE-EDGE PLATFORM AND AN EXTERNAL NETWORK

(71) Applicant: InterDigital Patent Holdings, Inc., Wilmington, DE (US)

(72) Inventors: Alexander Reznik, Pennington, NJ (US); Yogendra C. Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/585,327

(22) Filed: Feb. 23, 2024

(65) Prior Publication Data
US 2024/0196212 A1 Jun. 13, 2024

Related U.S. Application Data

(63) Continuation of application No. 15/747,558, filed as application No. PCT/US2016/044980 on Aug. 1, 2016, now abandoned.

(Continued)

(51) Int. Cl.
*H04L 29/06* (2006.01)
*H04L 9/32* (2006.01)
(Continued)

(52) U.S. Cl.
CPC ........... *H04W 12/06* (2013.01); *H04L 9/3213* (2013.01); *H04L 63/0876* (2013.01); *H04W 8/18* (2013.01);
(Continued)

(58) Field of Classification Search
CPC ........ H04W 12/06; H04W 12/041; H04L 9/32
See application file for complete search history.

(56) References Cited

U.S. PATENT DOCUMENTS

2013/0191884 A1* 7/2013 Leicher ................... H04L 63/08
726/4
2014/0349611 A1 11/2014 Kant et al.
(Continued)

OTHER PUBLICATIONS

ETSI, "Mobile Edge Computing (MEC); Technical Requirements," ETSI GS MEC 002 V1.1.1 (Mar. 2016).
(Continued)

*Primary Examiner* — Wasika Nipa
(74) *Attorney, Agent, or Firm* — Volpe Koenig

(57) ABSTRACT

An edge processing platform in a communications network is configured to communicate with at least one edge application. The edge processing platform comprises at least one processor configured to receive a registration request, from the at least one edge application. The registration request is a request to register a token. The token represents a wireless transmit/receive unit (WTRU) and the token is used to associate at least one traffic filter to the token. The at least one processor is configured to register the token in response to the received registration request. The at least one processor is configured to activate, in response to registering the token, the at least one traffic filter based on the token for routing traffic for the WTRU between the communications network and a local network.

10 Claims, 7 Drawing Sheets

Related U.S. Application Data

(60) Provisional application No. 62/198,902, filed on Jul. 30, 2015.

(51) Int. Cl.

| | |
|---|---|
| *H04L 9/40* | (2022.01) |
| *H04W 8/18* | (2009.01) |
| *H04W 12/041* | (2021.01) |
| *H04W 12/043* | (2021.01) |
| *H04W 12/06* | (2021.01) |
| *H04W 12/08* | (2021.01) |

(52) U.S. Cl.
CPC ....... *H04W 12/041* (2021.01); *H04W 12/043* (2021.01); *H04W 12/08* (2013.01)

(56) References Cited

U.S. PATENT DOCUMENTS

| | | |
|---|---|---|
| 2015/0188949 A1 | 7/2015 | Mahaffey et al. |
| 2015/0319174 A1 | 11/2015 | Hayton et al. |
| 2016/0006755 A1 | 1/2016 | Donnelly et al. |
| 2016/0087955 A1 | 3/2016 | Mohamad Abdul et al. |
| 2016/0344635 A1 | 11/2016 | Lee et al. |

OTHER PUBLICATIONS

ETSI, "Mobile-Edge Computing (MEC); Service Scenarios," ETSI GS MEC-IEG 004 V1.1.1 (Nov. 2015).

ETSI, "Mobile-Edge Computing (MEC); Technical Requirements," Draft ETSI GSM EC 002 V0.4.1 (Jul. 2015).

Interdigital et al., "Use Case: Unified Enterprise Communications," MEC(15)000085r52 (Jun. 30, 2015).

Reznik et al., "Identity Management with External Networks," MEC(15)000176 (Aug. 26, 2015).

Small Cell Forum, "Enterprise unified communications services with small cells," Release 7.0, Document 081.07.01 (Dec. 2013).

Small Cell Forum, "E-SCN network architectures," Release 7.0, Document 067.07.02 (Jan. 2016).

Small Cell Forum, "Small cell zone services, RESTful bindings," Release 7.0, Document 084.07.01 (Dec. 2013).

Third Generation Partnership Project, "Technical Specification Group Services and System Aspects; Identity management and 3GPP security interworking; Identity management and Generic Authentication Architecture (GAA) interworking (Release 13)," 3GPP TR 33.924 V13.0.0 (Jan. 2016).

Third Generation Partnership Project, "Technical Specification Group Services and System Aspects; Identity management and 3GPP security interworking; Identity management and Generic Authentication Architecture (GAA) interworking (Release 12)," 3GPP TR 33.924 V12.0.0 (Sep. 2014).

Third Generation Partnership Project, "Technical Specification Group Core Network and Terminals; AT command set for User Equipment (UE) (Release 13)," 3GPP TS 27.007 V13.1.0 (Jun. 2015).

Third Generation Partnership Project, "Technical Specification Group Core Network and Terminals; AT command set for User Equipment (UE) (Release 13)," 3GPP TS 27.007 V13.5.0 (Jun. 2016).

Third Generation Partnership Project, "Technical Specification Group Core Network and Terminals; AT command set for User Equipment (UE) (Release 14)," 3GPP TS 27.007 V14.0.0 (Jun. 2016).

* cited by examiner

100

ENABLING COORDINATED IDENTITY MANAGEMENT BETWEEN AN OPERATOR-MANAGED MOBILE-EDGE PLATFORM AND AN EXTERNAL NETWORK

CROSS REFERENCE TO RELATED APPLICATIONS

This application is a continuation of U.S. patent application Ser. No. 15/747,558 filed Jan. 25, 2018, which is the U.S. National Stage, under 35 U.S.C. § 371, of International Application No. PCT/US2016/044980 filed Aug. 1, 2016, which claims the benefit of U.S. Provisional Application No. 62/198,902, filed Jul. 30, 2015, the content of which are hereby incorporated by reference herein

SUMMARY

A variety of approaches may be used for enabling coordinated identity management between an operator-managed mobile edge platform (MEP) and an external network. A token may be generated in an operator-managed MEP, such that the token may support association of a mobile network identity of a wireless transmit/receive unit (WTRU) and an external network identity of an external network. The MEP may support setting packet filters based on the token for the purpose of routing traffic associated with an external network user, such as an enterprise user, to the external network. The token may be negotiated on a per-session basis or on a per-WTRU-identity (WTRU-ID) basis. In an example method performed by a WTRU camped on a small cell network covered by the MEP, an enterprise bring your own device (BYOD) client (EBC) application may establish a secure link with an enterprise BYOD agent (EBA) application running on the MEP in the small cell network using an initial connection procedure. The EBC application may initiate an application-level authentication procedure with an evolved packet core (EPC) network. The EBC application may generate and provide a token to the EBA application via the established secure link.

BRIEF DESCRIPTION OF THE DRAWINGS

A more detailed understanding may be had from the following description, given by way of example in conjunction with the accompanying drawings wherein.

DETAILED DESCRIPTION

Figure 1A:
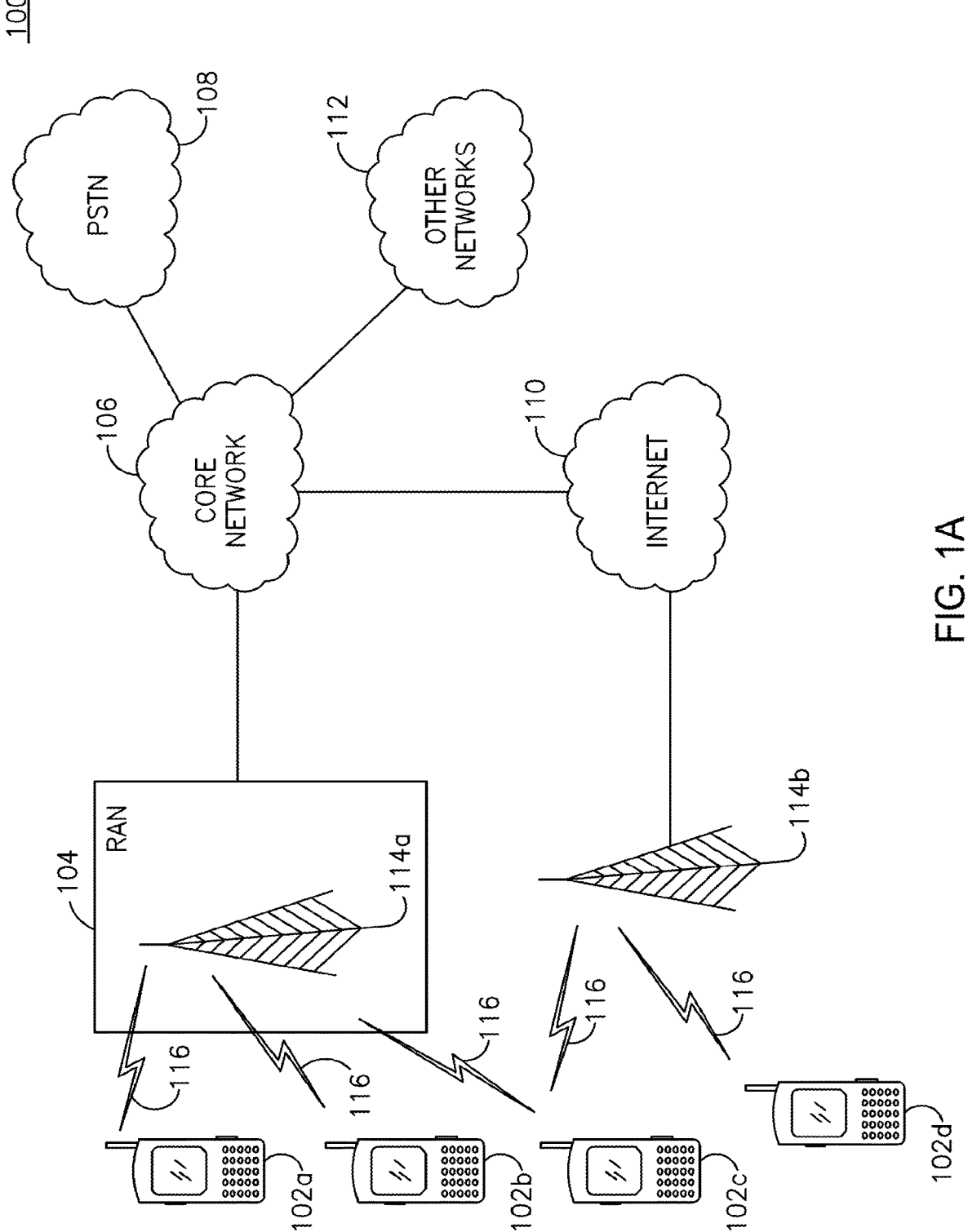
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a tablet, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a small cell, a wireless router, and the like. While base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may be further divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
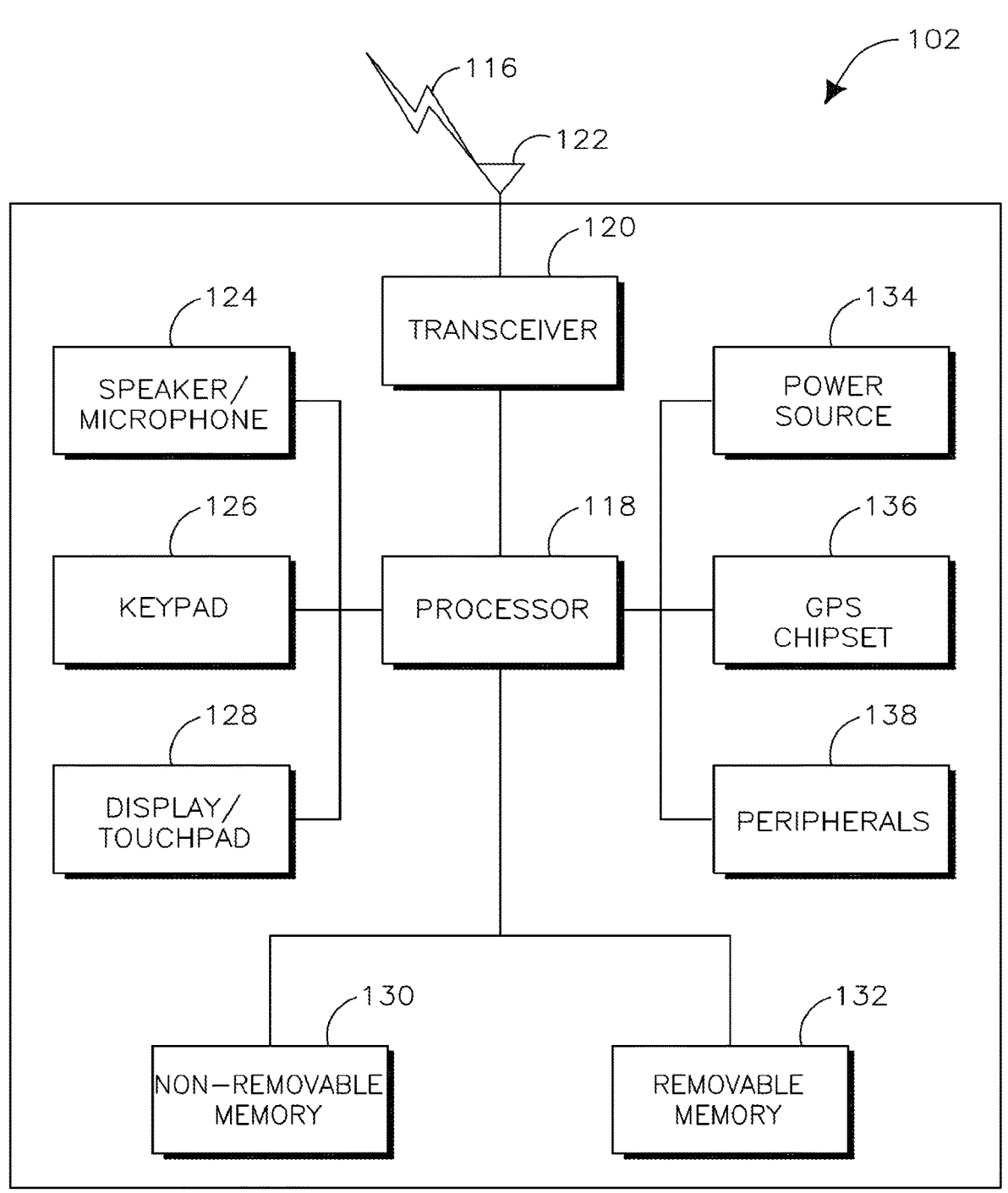
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
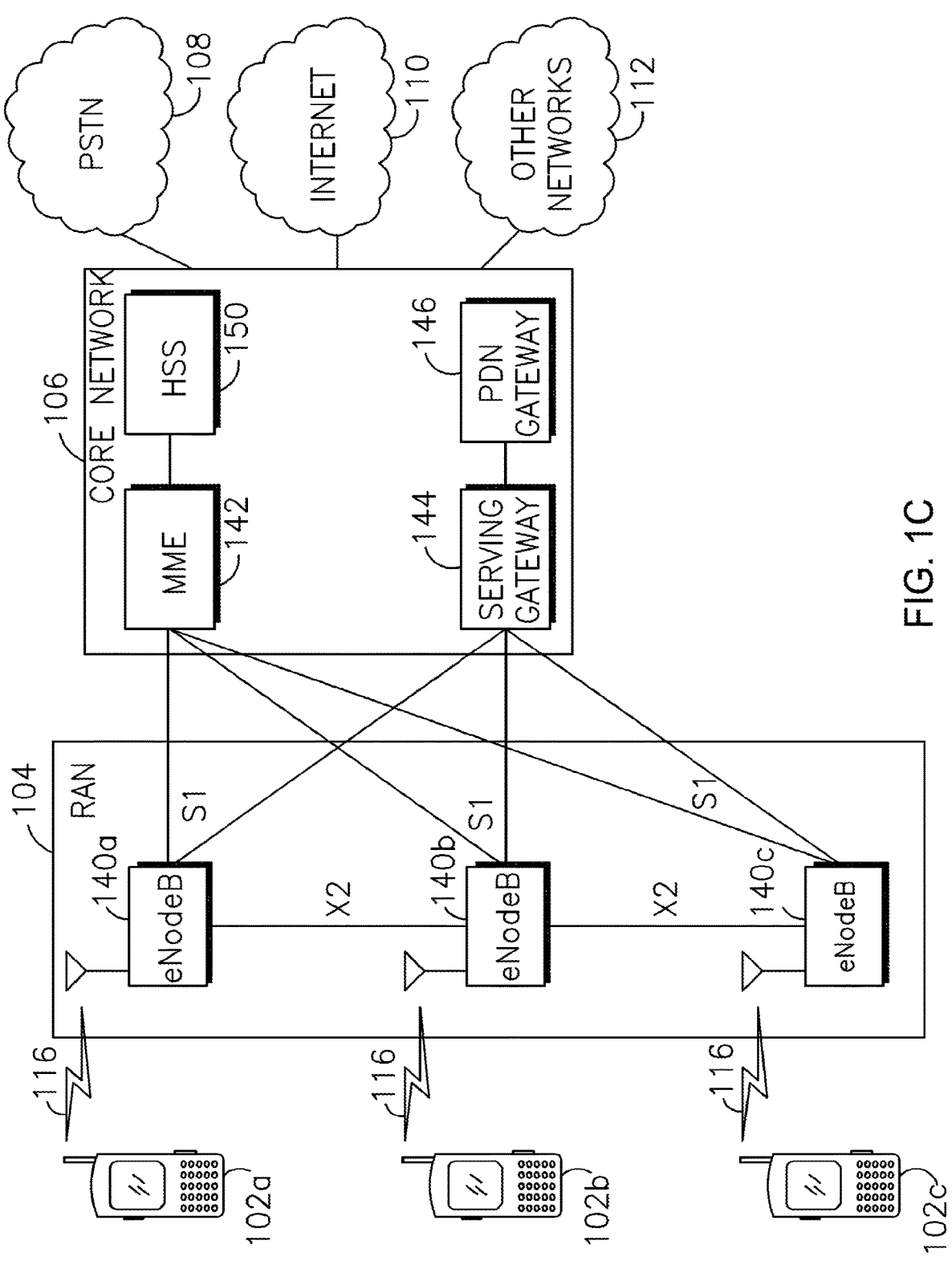
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. For example, an HSS 150 may be used to authenticate a user subscription. Once a user subscription is authenticated, the MME 142 may continue to provide for security functions, for example during a session. A user may be authenticated by a higher layer function such as an Authentication, Authorization and Accounting (AAA) server (not shown), which may communicate with the HSS 150. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Approaches may be used for enabling coordinated identity management between an operator-managed mobile edge platform (MEP) and/or a small cell network and an external network. A token may be generated in an operator-managed MEP, such that the token may support association of a mobile network identity and an external network identity. The MEP may support setting packet filters based on the token for the purpose of routing traffic associated with an external network user, such as an enterprise user, to/from the external network. The token may be negotiated on a per-session basis or on a per-WTRU identity (WTRU-ID) basis.

According to the European Telecommunications Standards Institute (ETSI) Mobile Edge Computing (MEC) Industry Specification Group (ISG) call for a mobile edge platform, a mobile edge platform, such as the MEC platform, may support the use of a token through which an external application may register with the MEC platform. The token may be designed such that the MEC platform is able to associate a set of Internet Protocol (IP) flows (e.g., IP five-tuples) with the token. In this case, the application running on the MEC platform may be able to set filters in the MEC platform to route traffic associated with the token directly to/from an external network. An application of this capability may be illustrated in an example scenario, where a small cell network may be deployed within an enterprise where unified communication concepts are used to enable features such as four-digit extension dialing directly to a user's mobile device. Herein, a mobile edge platform and/or MEC platform may be used interchangeably, where the MEC platform may be an example of a mobile edge platform. The examples described herein may apply to any mobile edge platform, and is not limited to a MEC platform.

In the following example use case, a token may be used to support unified communications. In an example, an individual may walk into his office (e.g., within an enterprise/business/company setting) with a mobile device (e.g., an Android smartphone). The office may have deployed a small cell network (including one or more small cells) with a mobile edge MEC platform located in an enterprise small cell concentrator. On the MEC platform, there may be an enterprise bring your own device (BYOD) agent (EBA) MEC application. The individual's mobile device may camp on one of the small cells deployed in the office. An enterprise BYOD client (EBC) on the individual's mobile device may detect that it is camped on the enterprise (small cell) network. Herein, the EBA application may be referred to interchangeably as a client agent application, and the EBC may be referred to interchangeably as a client application.

The EBC on the mobile device may initiate discovery and may connect to the EBA on the MEC platform. Once the EBC has established the initial connection with the EBA, a token (e.g., a master connectivity token) may be established. Once a master connectivity token is established, the master connectivity token may be used to generate a per-session (or session) token to be used to facilitate traffic filtering as application level sessions are established on the individual's device. The EBA may set a filter in the mobile edge (MEC) platform to forward some or all traffic associated with the master connectivity token to the EBA and/or to the enterprise network based on the policy criteria associated with the application-derived session token. The EBA and/or the enterprise network may have the capability to distinguish between enterprise and external traffic and route that traffic accordingly. In an example, forwarded traffic may go to an enterprise-internal traffic forwarding unit, which may have the ability to distinguish between enterprise communications and external (to the enterprise) network traffic. The enterprise communications may be passed on to a firewall and external communications may be forwarded out to the Internet, for example.

The examples described herein may use an enterprise network as an example of an external network (e.g., a network that is external to a mobile operator), but may also apply to any type of external network. Similarly, the abbreviations "EBA" and "EBC", although typically characterized to refer to an enterprise network, may equally apply to any type of external network (e.g., where "E" in EBA and EBC may mean external and/or enterprise).

The example procedures and/or approaches described herein may be directed to several aspects of the interfacing of mobile edge (MEC) platform(s) and external network(s) using a token. For example, methods and systems may be used for establishing, by the EBA and/or EBC, an initial connection, and/or negotiating and agreeing on the token. For example, the token may be associated with a user identity and/or with each specific application session associated with the user. The case where the token association is with each specific application, the session may be more fine-grained and/or dynamic than association with only a user identity. In another example, systems and methods may address how the enterprise network deals with the received traffic that is forwarded from the MEC platform. Example aspects of the EBA and EBC are described further below.

Figure 2:
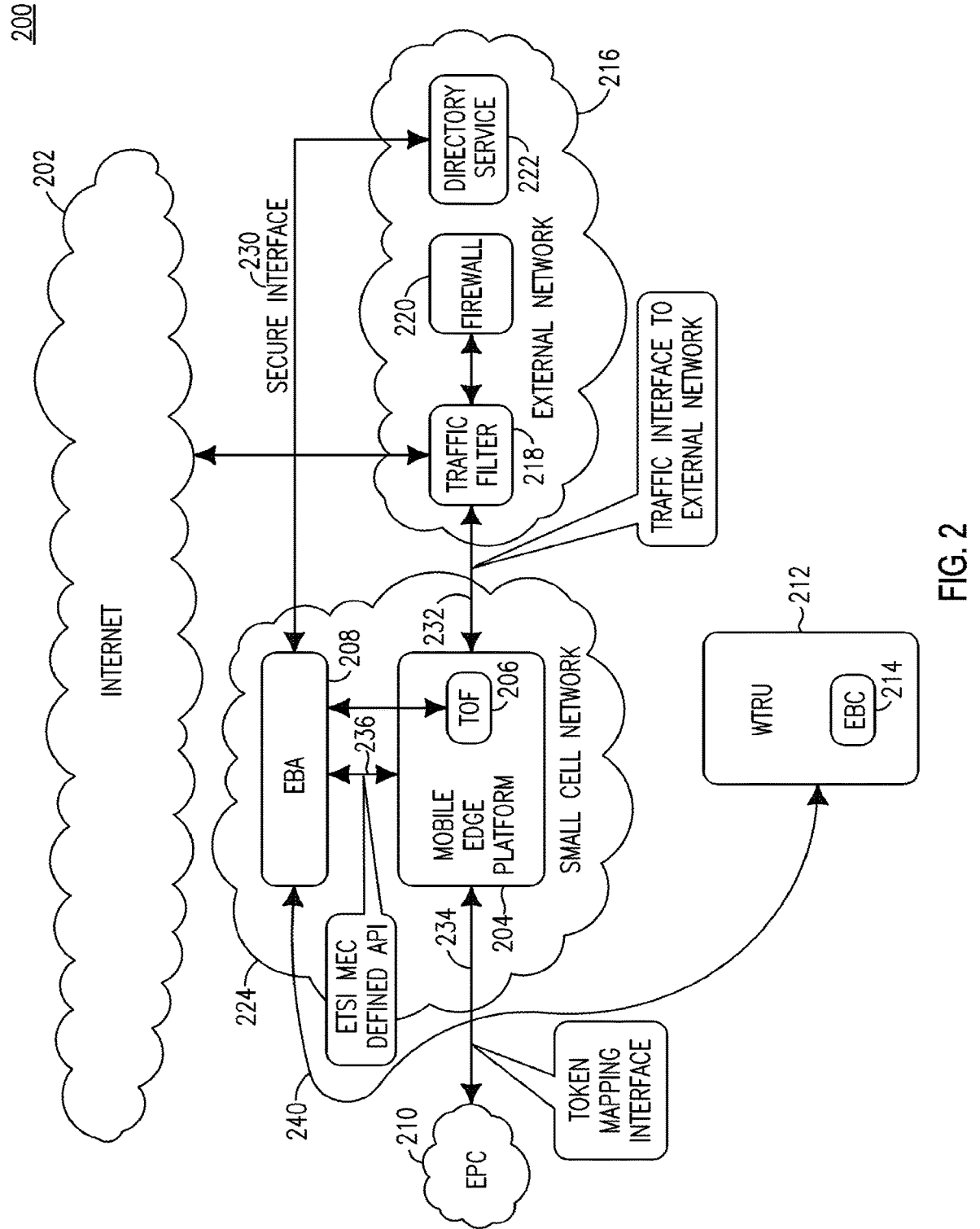
FIG. 2 shows a system diagram of an example system architecture including a mobile edge platform (MEP) and an external network (e.g., an enterprise network)

FIG. 2 shows a system diagram of an example system architecture 200 including a mobile edge platform (MEP) 204 and an external network 216 (e.g., an enterprise network). The example system architecture 200 may include, but is not limited to include, any of the following devices, entities and/or components: a public Internet 202, which may be IP-based; at least one small cell network 224, which may include a MEP 204, and/or an EBA 208; a WTRU 212, which may include an EBC 214; an external network 216, which may include a traffic filter 218, a firewall 220, and/or a directory service 222; and/or an enhanced evolved packet core (EPC) network 210 (e.g., the mobile operator's EPC network). The mobile edge platform 204 may include, but is not limited to include, a traffic offload function (TOF) 206.

In an example, a user device may include a mobile WTRU 212 and an EBC 214. The EBC 214 may run on the WTRU 212 as an application in the application layer and/or in an operating system, for example. A small cell network 224 may include the MEP 204 and the EBA 208. The EBA 208 may be an application running in the small cell network 224, and the EBA 208 may take advantage of some services that are offered by the MEP 204, such as the TOF 206. The MEP 204 may provide many other services to applications running on user devices in addition to those shown in FIG. 2.

In an example, an external (enterprise) network 216 may include, but is not limited to include, any of the following entities and/or services: a user identity management system such as the directory service 222; a firewall 220; and/or a pre-firewall traffic filter 218. Other entities, not shown, may be part of the external network 216. The EPC 210 may be a standard EPC and may support some enhanced interfaces, as described herein. The public IP-based Internet 202 may enable the traffic source and/or destination and/or may provide a route-through path for traffic. Interfaces in system architecture 200 may include, but are not limited to include, any of the following interfaces: a secure interface 230 between the EBA 208 and the directory service 222; traffic interface 232 between the MEP 204 and the external network 216; token mapping interface 234 between the EPC 210 and the MEP 204; and/or an application programming interface (API) 236 (e.g., ETSI MEC-defined API) between EBA 208 and MEP 204. Procedures for establishing an initial connection 240 between the EBA 208 and the EBC 214 are described below.

In an example, when a WTRU 212 camps on a cell that is part of a small network 224 associated with the MEP 204 and EBA 208 running on top of MEP 204, the EBC 214 running in the WTRU 212 may need to establish the initial connection 240 with the EBA 208. The WTRU 212 may be in the vicinity of one or more small cell networks and/or external networks. The EBC 214 may use approaches to recognize if it is camped on a small cell network 224 associated with a specific (e.g., desired) external network 216. This may be accomplished by providing the EBC 214 with a list of evolved Node B (eNB) identifiers (IDs) associated with the small cell network 224. The provisioning of the list of eNB IDs may be done, for example, using a policy exchange (not shown) run by the external network 216.

The EBC 214 may subscribe to notifications of eNB ID(s) with the WTRU 212 so that the EBC 214 may be informed of the eNB ID(s) whenever the WTRU 212 camps on a small cell network (e.g., small cell network 224). In an example, the EBC 214 may check the eNB ID(s) against an existing list of eNB IDs, where the existing list of eNB IDs may be pre-programmed in the EBC 214, for example. In another example, if supported by the WTRU 212, the EBC 214 may provide the WTRU 212 with a list of eNB IDs of interest so that the EBC 214 is only notified when the WTRU 212 is camped on one of the eNBs in the list of eNBs IDs of interest. In another example, the EBC 214 may use intermittent polling in addition to or instead of a notification service. If the small cell network 224 and/or the operator (not shown) offers a zonal presence service, the EBC 214 may subscribe to the zonal presence service.

Once the EBC 214 has established that the WTRU 212 is camped on the small cell network 224, associated with the external network 216, the EBC 214 may establish an initial communication session with the EBA 208. To facilitate this, the EBA 208 may provide one or more known static IP addresses, which may be known by the EBC 214, to the MEP 204. For example, these known static IP addresses may be pre-programmed in the EBA 208 and/or EBC 214 by the external network 216 via a policy and configuration mechanism. The EBC 214 may select one of the known static IP addresses and use it to initiate an authentication session with the EBA 208. The authentication process may employ any authentication techniques, such as a variety of extensible authentication protocol (EAP) methods or federated authentication methods such as Open Identity (OpenID) (e.g., OpenID 2.0 or OpenID Connect) or OpenID generic bootstrap architecture (OpenID-GBA). The result of the authentication is as described below.

In an example, a set of security credentials may be employed by the EBC 214 and EBA 208 to communicate securely. For example, an IP address may be assigned at the EBA 208, such that the IP address may be known only to the EBC 214 and may be used only by the EBC 214 for secure communications.

In an example, a communication session may be established between the EBC 214 and the EBA 208 via the public Internet 202. In this case, the EBA 208 may expose public IP addresses to the Internet 202, and the EBC 214 may access the exposed public IP addresses to establish the initial communication 240 and authentication between the EBA 208 and the EBC 214. Once authenticated, the EBA 208 may continue to use the same public IP address or another IP address (e.g., a static IP address or an IP address established via a Dynamic Host Configuration Protocol (DHCP)) may be used by the EBA 208.

Establishing a communication session between the EBC 214 and the EBA 208 via the Internet 202 may create a communication path that is unnecessarily long because the connection between the EBA 208 and EBC 214 may pass through the EPC 210 and the Internet 202 even if the EBA 208 and EBC 214 are relatively close together. Moreover, establishing a communication session between the EBC 214 and the EBA 208 via the Internet 202 may expose an IP address to the Internet 202, which may expose the EBA 208 to certain security risks including a denial of service (DOS) attack, for example.

In an example, the public Internet 202 may be avoided by leveraging the MEP 204 and/or the TOF 206 service. For example, the EBA 208 may provide a set of IP addresses to the MEP 204. These IP addresses may be static and may be pre-programmed into the EBC 214 or an IP address may be generated dynamically on demand using such protocols as DHCP. The IP address(es) may or may not be public (e.g., an IP address may come from a private space and therefore not be public or exposed outside of the EBA 208). The EBA 208 may configure the TOF 206 to forward traffic for the IP address(es) to the EBA 208. Thus, all initial communication 240 between the EBC 214 and the EBA 208 may be configured to go directly through the MEP 204. In an example, once the EBC 214 has authenticated with EBA 208, the EBA 208 may perform, but is not limited to perform, any of the following functions: provision a new, temporary private IP address for the EBC 214; communicate the new, temporary private IP address to the EBC 214; and/or configure the TOF 206 to route traffic between the EBA 208 and the EBC 214. In another example, an IP address may be dynamically assigned during the period when the WTRU 212 attempts to camp on the small cell network 224 (e.g., using DHCP to assign an IP address).

The entities and/or devices referred to hereinafter in the description of example procedures and approaches may be included in a system architecture such as the example system architecture 200 of FIG. 2. Moreover, the entities and/or devices referred to hereinafter in the description of example procedures and approaches may communicate (or equivalently pass, provide, send/receive, and/or transmit/receive) over interfaces, such as the interfaces shown in the example system architecture 200 of FIG. 2.

Figures 3, 4:
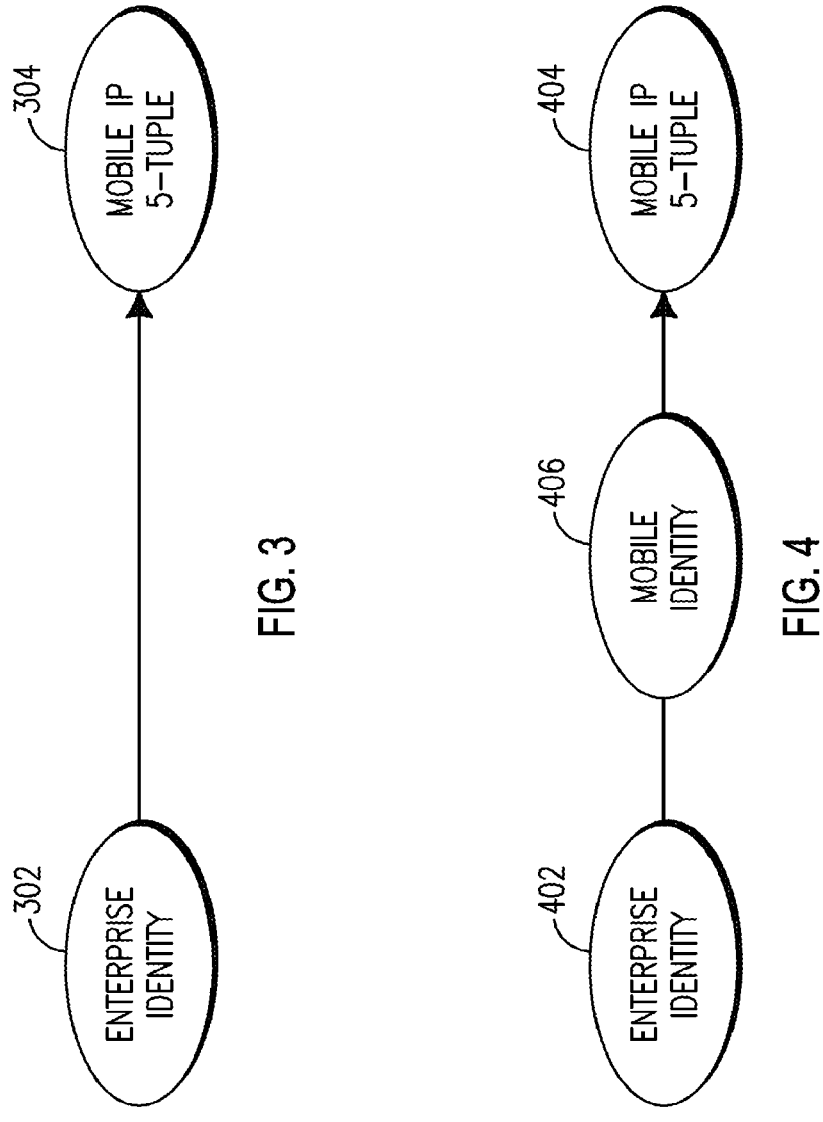
FIG. 3 shows a mapping diagram of an example ideal token mapping.
FIG. 4 shows a mapping diagram of an example token mapping.

Example procedures for token derivation are described herein. In an example approach, token-derivation may be done on a per-user basis. FIG. 3 shows a mapping diagram of an example ideal token mapping 300. In the example token mapping 300, an enterprise is assumed as an example of an external network. The enterprise identity 302 is directly mapped to a mobile IP 5-tuple 304. However, this ideal token mapping 300 may not be feasible because it may not be possible to associate IP 5-tuples inside a mobile network with an external identity of a user.

FIG. 4 shows a mapping diagram of an example token mapping 400, which may be more feasible than the token mapping 300 of FIG. 3. In the example token mapping 400, a mobile identity 406 may be used as an intermediary in mapping the enterprise identity 402 to the mobile IP 5-tuple 404. In this case, a mobile network, and in particular the MEP, may more easily associate mobile IP 5-tuples 404 with a mobile identity 406. The example token mapping 400 may use an interface into the MME. Example approaches may be used to associate the mobile identity 406 and the external network (enterprise) identity 402, as described below.

In an example, a direct association may be made between an external network identity and a mobile identity. For example, if a Mobile Station International Subscriber Directory Number (MSISDN) (i.e., the mobile phone number) may be used, the EBA may be pre-programmed with the mapping between the MSISDN/mobile phone number and the mobile user identity. For example, the MSISDN/mobile phone number may be used when the external network belongs to an enterprise. In this case, the MEP may provide a service that allows an application (e.g., the EBA) to be notified of a particular MSISDN/mobile phone number camped on the small cell network, and/or some or all of the MSISDNs/mobile phone numbers camped on the small cell network. The EBA may then request that the MEP re-route traffic associated with the MSISDN/mobile phone number.

In another example, the use of the MSISDN/mobile phone number as an identifier may not be sufficient. In some applications, a stronger association, such as an International Mobile Subscriber Identity (IMSI)-based or Temporary Mobile Subscriber Identity (TMSI)-based association, may be used or needed. In these cases, it may not be possible to provide a direct authentication of an external network identity and mobile identity for various reasons including: it may risk revealing the IMSI or TMSI to the enterprise network, which may not be acceptable to the mobile network operator for security reasons; and/or it may risk revealing the external network identity to the operator, which may not be acceptable in an enterprise setting for security reasons.

Thus, mechanisms may be developed to provide bindings of the independent mobile and external network identities used by the EPC/MEP and EBA while maintaining the privacy of the identities between the EPC/MEP and EBA. To solve these issues, example approaches for generating a token that provides an association between the external network identity and the mobile identity, while completely hiding these identities between the mobile network operator and external network, are described below. A token may be used to provide for the identity binding by enabling a receiving party to present the token to a requesting party to indirectly reference an identity known by the requesting party without revealing the identity to the receiving party. The token may be generated in a variety of ways including for example: a randomized string bound to or derived from an identifier, such as an IMSI; and/or the result of an authentication procedure.

Figure 5:
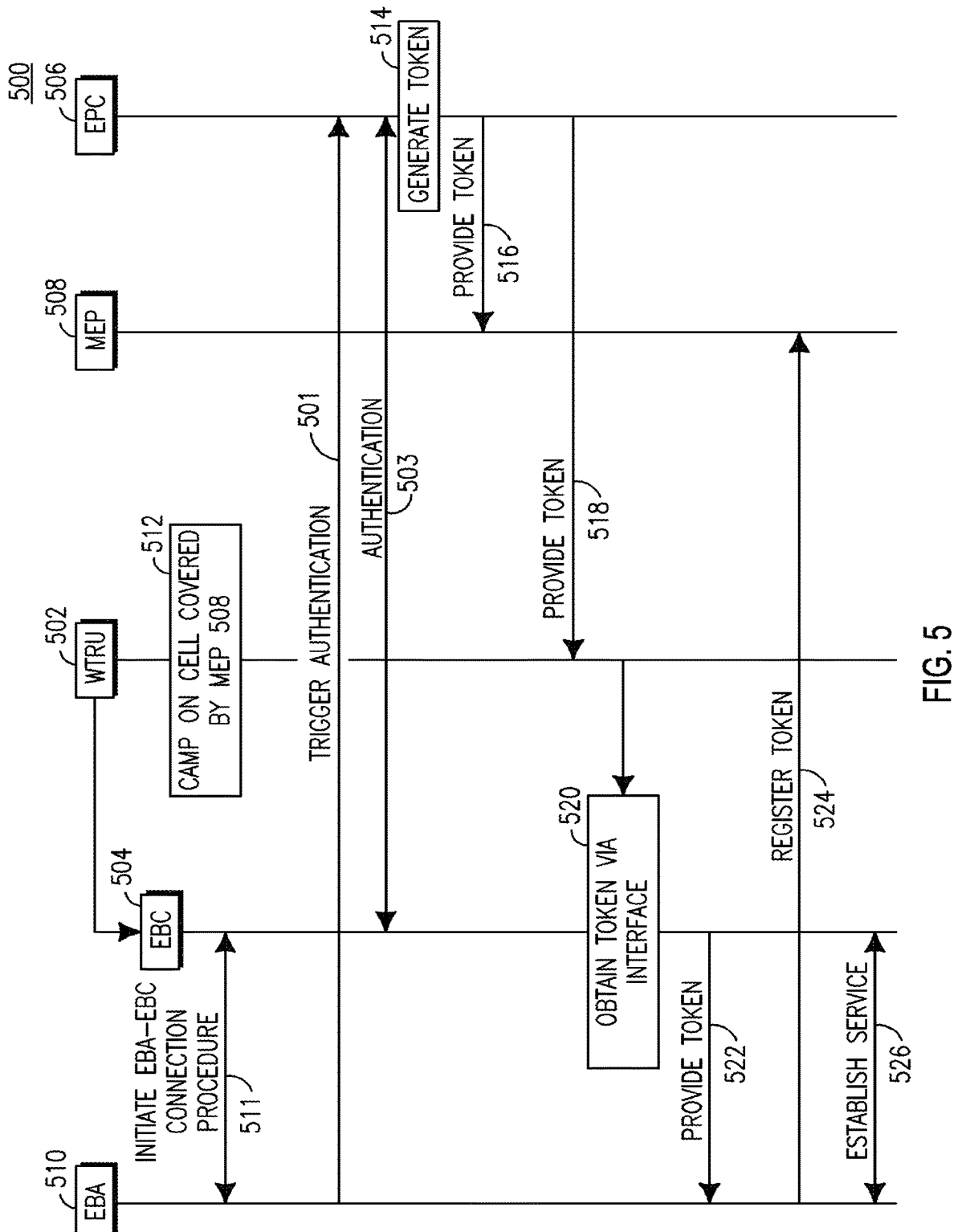
FIG. 5 shows a flow diagram of an example token generation and assignment procedure.

FIG. 5 shows a flow diagram of an example token generation and assignment procedure 500. In example procedure 500, the following assumptions may be made: the EPC 506 may have the capability to generate a token for a WTRU 502 and pass it to both the MEP 508 and the WTRU 502; and the WTRU 502 may have the capability to provide the token to an application (e.g., the EBC 504).

At 512, WTRU 502 may camp on a cell covered by an MEP platform 508. An EBA-EBC connection procedure may be initiated, at 511, between the EBA 510 and EBC 504 that may trigger the generation of a token. At 501, the EBA 510 may initiate the trigger for an authentication procedure 503 between the EBC 504 and the EPC 506 (e.g., using OpenID-GBA as defined by the 3GPP). The identifier used to initiate the authentication 501 may be based on the IMSI or TMSI of the WTRU 502 or the WTRU ID or an EBC identifier associated with the WTRU 502, for example. Once the authentication procedure 503 is complete, at 514, the EPC 506 may generate a token. At 516, the EPC 506 may provide the token, and/or the identity mapping, to the MEP 508 over an EPC-MEP interface. In an example not shown, an interface may be put in place for the MEP 508 to request the identity mapping once it is provided with a token (e.g., by the EBA 510).

At 518, the EPC 506 may provide the token to the WTRU 502 over an EPC-WTRU interface. At 520, the EBC 504 (e.g., an application running on the WTRU 502 or elsewhere) may obtain the token from the WTRU 502 via a provided interface. At 522, the EBC 504 may pass or provide the token to the EBA 510. In an example, the EPC 506 may sign the token to protect it from tampering or it may be transported using a secure EBC-EBA channel, which may be established during an initial EBC-EBA connection procedure. At 524, the EBA 510 may register the token with the MEP 508. At 526, the EBA 510 may establish service with the EBC 504.

While the example token generation and assignment procedure 500 may provide a secure means of communicating the token, the implementation may involve the following interfaces for passing the token: an EPC-MEP interface; an EPC-WTRU interface; and/or a WTRU-local application (e.g., EBC) interface. The Open Identity (OpenID 2.0 or OpenID Connect) protocol with the generic bootstrap architecture (GBA) protocol may be suitable to specify these interfaces.

Figure 6:
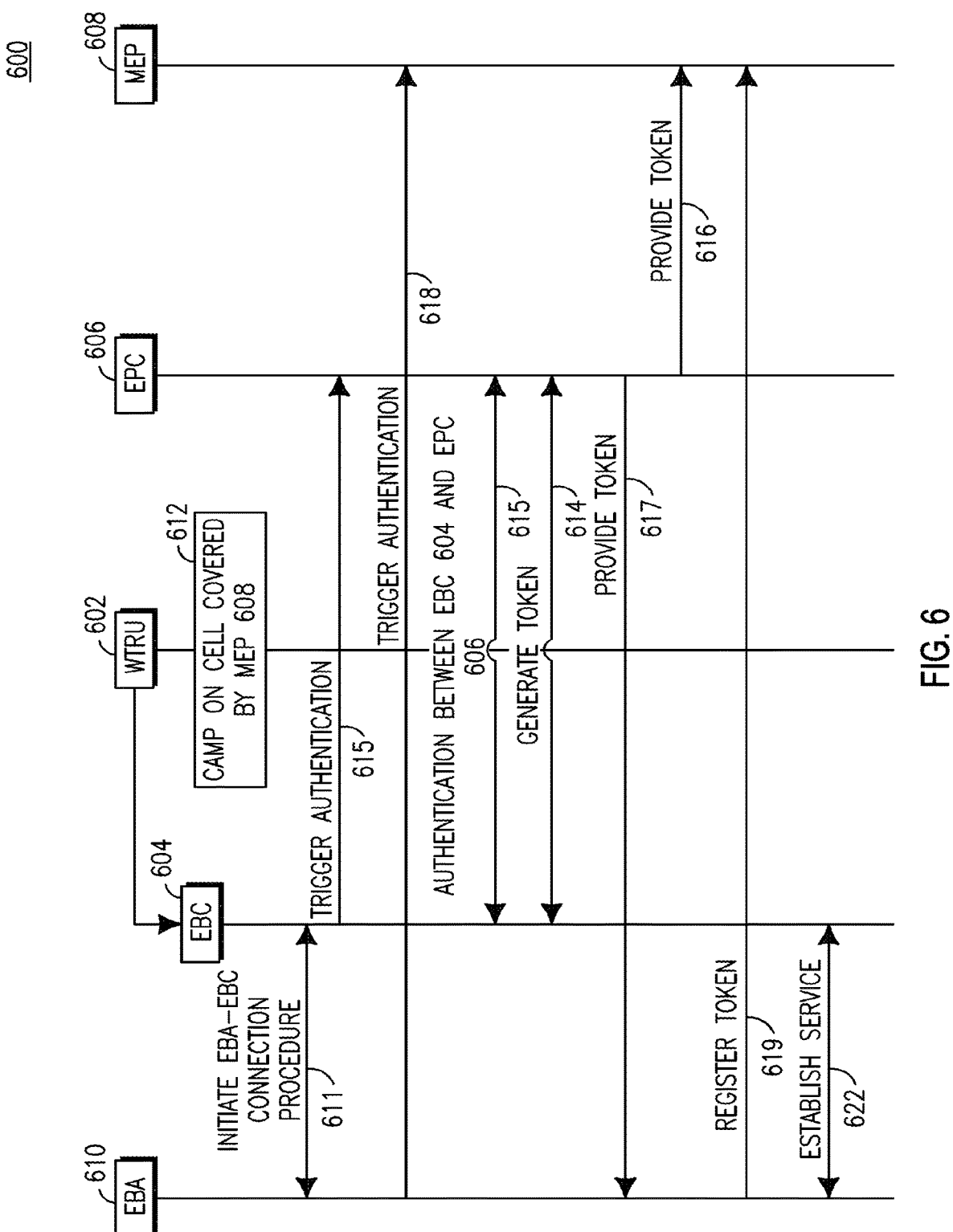
FIG. 6 shows a flow diagram of another example token generation and assignment procedure.

FIG. 6 shows a flow diagram of another example token generation and assignment procedure 600. In example procedure 600, the following assumptions may be made: the EPC 606 may have the capability to pass a token to the MEP platform 608 (e.g., a MEC platform); the EPC 606 may support extensible authentication protocol (EAP)—subscriber identity module (SIM) (EAP-SIM) authentication, and/or EAP—authentication and key agreement (AKA) (EPA-AKA) authentication and/or EAP—authentication and key agreement' (AKA') (EPA-AKA') authentication (e.g., EAP-SIM, EAP-AKA and EAP-AKA' supported in Hotspot (HS) 2.0); and/or the Universal Integrated Circuit Card (UICC) design may support APIs to support the 3GPP defined generic bootstrapping architecture (GBA) architecture.

In the example token generation and assignment procedure 600, at 612, the WTRU 602 may camp on an MEP 608-covered cell. At 611, establishment of an EBC-EBA connection link may be initiated. At 618, the EBA 610 may initiate the trigger for an authentication procedure 615 between the EBC 604 and the EPC 606 (e.g., using OpenID-GBA as defined by the 3GPP). The identifier used to initiate the authentication procedure 615 may be based on the IMSI or TMSI of the WTRU 602 or the WTRU ID or an EBC identifier associated with the WTRU 602, for example. Once the authentication procedure 615 is complete, at 614, the EBC 604 and the EPC 606 may generate a token, which may be independently generated or communicated from one party to the other. This may occur, for example, similar to the way a pairwise master key (PMK) is generated once an EAP-AKA authentication is completed in Wi-Fi networks.

At 617, the EPC 606 may pass or provide the token to the EBA 610, for example via an EPC-EBA interface. At 616, the EPC 606 may pass or provide the token to the MEP platform 608, for example via an EPC-MEP interface. In order to conclude establishment of a service 622 between the EBC 604 on the WTRU 602 and the EBA 610, the EBC 604 may pass or provide the token to the MEP 608. The token provides a means for performing identity binding and subsequent establishment of appropriate traffic filters. At 619, the EBA 620 may register the token with the MEP 608. At 622, the EBA 610 and the EBC 604 may establish a service.

In another example, the EPC 606 may use the interface with the MEP 608 to provide to the MEP 608 the token and/or a WTRU identifier and/or a list of IP addresses associated with the WTRU ID of the WTRU 602. In another example, not shown, the MEP 608 may use the interface with the EPC 606 to provide the token (e.g., the token received by the MEP 608 from the EBA 610) to the EPC 606 and have the EPC 606 return to the MEP 608 a WTRU identifier and/or a list of IP addresses associated with the WTRU ID of the WTRU 602.

In other examples, the call flows described in FIG. 5 and FIG. 6 may be performed with the MEP as an end point instead of the EPC since a binding relationship may exist between the EPC and MEP. Furthermore, in place of an authentication to derive a token, a bootstrapping procedure may be carried out to derive a token, achieving the same objective.

The token derivation procedures described above may derive a token that binds a user's mobile device identity and an external device identity whenever a user is present within a coverage zone of a particular MEP. This binding may be associated with all of the user's traffic, whereas the external network traffic may only be associated with some, but not all the application sessions that run on a user's device. Forwarding all the user's traffic to the external network may be inefficient and/or may cause the external network to deploy its own traffic filtering at the network entry point. Thus, an enhanced per-session procedure may be used to dynamically allocate tokens on a per-session basis, while continuing to deliver all the privacy of the per-WTRU token approaches discussed above.

According to an example per-session token assignment procedure, a trust relationship and a binding may be formed between the EPC and the EBC on the WTRU, using for example the approaches or procedures described herein. The resulting token, which may be referred to as a Master token, may not need to be passed or provided from the EBC to EBA and/or from the EPC to the MEP.

The EBC may implement an interface (e.g., an API) that may allow authorized (enterprise) applications to request creation of a session token for the MEP, in order to redirect its session traffic to the external network. How the EBC knows that the application is authorized may depend on how the external entity that owns the external network operates. Once the EBC has received a request to create a session token, the EBC may allow the authorized application to inform the EBC about the traffic filters (e.g., IP 5-tuples) associated with the EBC's session(s). The EBC may use the secure interface it has with the EPC to provide the traffic filters to the EPC and a Session token may be derived from the Master token. The Master→Session token derivation procedure may be known and executed by the EPC and EBC so that a mutual derivation of the Session token may be facilitated.

The EBC may provide the Session token to the EBA. When the EBA requests the MEP to filter traffic based on this Session token, the MEP may be able to associate the Session token to a set of known filters, for example by requesting the information from the EPC or based on the EPC having previously provided the EBA with the mapping information.

A trust relationship may exist between the WTRU and the EPC, and thus may also exist between the WTRU and the MEP by way of association of the MEP with the EPC. A trust relationship may exist between the EBC application on the WTRU and the EBA application on the enterprise small cell network. An interface may be implemented between the EBC and WTRU and between the EBA and MEP (e.g. APIs) to facilitate steering of application traffic in the enterprise small cell network by way of traffic filters (e.g. IP 5-tuples). When an enterprise application is activated, the enterprise application may request creation of a session token that may be relayed to the MEP in order to steer the application's session traffic to the external network.

For example, the session token may be generated through an authentication between an enterprise application interfacing to the EBC on the WTRU and the EBA in the enterprise network. The EBC may use the interface it has with the EPC to derive a Session token from the Master token. The Master→Session token derivation procedure may be known and executed by the EPC and EBC and thus the EBC and EPC can mutually derive the Session token or derive the Session token on one side (i.e. in the EBC or the EPC) and then exchange the Session token through a secure interface between the EBC and EPC. The derived Session token may be bound to the specific application session. Subsequently, the enterprise application may inform the MEP about the traffic filters (e.g. IP 5-tuples) associated with the session by way of a reference to the Session token that may bind the traffic filter information with the specific application session on the WTRU.

In another example, the Master token may be passed to the MEP by the EPC. A Session token may be generated through an authentication procedure between an enterprise application interfacing to the EBC on the WTRU and the EBA in the enterprise network. The EBA may use the interface it has with the MEP to derive a Session token from the Master token. The Master→Session token derivation procedure may be known and executed by the EBA and the EBC through a bootstrapping procedure with the MEP, which may result in the Session token at each of the EBA and EBC. The derived Session token may be bound to the specific application session. The enterprise application may inform the MEP about the traffic filters (e.g. IP 5-tuples) associated with the session by way of a reference to the Session token, which may bind the traffic filter information with the specific application session on the WTRU.

In another example, if the per-session functionality for external networks as described above is not used, the EBA may be able to direct the TOF in the MEP to forward all traffic associated with an external network (e.g., an enterprise network) user identity directly towards the external network. However, not all such traffic may be destined for the external network. For example, much of the traffic may be destined for the Internet. In this case, it may be detrimental to the external network to allow all such traffic, including Internet traffic, to enter the external network and then forward it back out to the Internet. Thus, a traffic filtering function, for example located at the entry point to the external network and before (or after) the firewall, may be used. The traffic filtering function may be configured by the external network to distinguish its own internal traffic from all other Internet traffic. In an example, only the internal traffic is forwarded to the firewall, while the Internet traffic is routed directly to the Internet.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) comprising an edge client, the method comprising:
    sending a subscription request for cell identities (IDs) associated with an Edge Data Network (EDN);
    receiving policy information, in response to the subscription request sent by the WTRU, wherein the policy information comprises information to access edge data services in the EDN, wherein the policy information comprises the cell IDs associated with the EDN;
    receiving security credential information, wherein the security credential information comprises an access token, wherein the security credential information is based on a WTRU identity;
    determining that the WTRU is camped on a cell having a cell ID associated with the EDN; and
    establishing a communication session with a node in the EDN using the security credential information.

2. The method of claim 1, wherein receiving policy information is in response to a request sent by the WTRU.

3. The method of claim 1, wherein the policy information comprises cell IDs in an EDN service area.

4. The method of claim 1, wherein the establishing a communication session with a node in the EDN using the security credential information comprises sending the access token to the node.

5. The method of claim 1, wherein the establishing a communication session with a node in the EDN further comprises:

sending a registration request to the node, wherein the registration request comprises the security credential information; and
    receiving a successful registration response from the node.

6. A wireless transmit/receive unit (WTRU) comprising an edge client, the WTRU comprising:
    a receiver;
    a transmitter; and
    a processor, wherein:
    the transmitter is configured to send a subscription request for cell identities (IDs) associated with an Edge Data Network (EDN);
    the receiver is configured to receive policy information, in response to the subscription request sent by the WTRU, wherein the policy information comprises information to access edge data services in the EDN, wherein the policy information comprises the cell IDs associated with the EDN;
    the receiver is further configured to receive security credential information, wherein the security credential information comprises an access token, wherein the security credential information is based on a WTRU identity;
    the processor is configured to determine that the WTRU is camped on a cell having a cell ID associated with the EDN; and
    the receiver and the processor are further configured to establish a communication session with a node in the EDN using the security credential information.

7. The WTRU of claim 6, wherein the policy information is received in response to a request sent by the WTRU.

8. The WTRU of claim 6, wherein the policy information comprises cell IDs in an EDN service area.

9. The WTRU of claim 6, wherein the receiver and the processor are further configured to send the access token to the node to establish a communication session with a node in the EDN.

10. The WTRU of claim 6, wherein:
    the transmitter is further configured to send a registration request to the node, wherein the registration request comprises the security credential information; and
    the receiver is further configured to receive a successful registration response from the node.

\* \* \* \* \*